(12) United States Patent
Kim et al.

(10) Patent No.: US 8,122,494 B2
(45) Date of Patent: Feb. 21, 2012

(54) APPARATUS AND METHOD OF SECURING NETWORK

(75) Inventors: Won-Jip Kim, Pyeongtaek-si (KR); Yeon-Sik Ryu, Suwon (KR); So-Ra Son, Anyang (KR)

(73) Assignee: LG CNS Co., Ltd., Seoul (KR)

( * ) Notice: Subject to any disclaimer, the term of this patent is extended or adjusted under 35 U.S.C. 154(b) by 1064 days.

(21) Appl. No.: 11/959,129

(22) Filed: Dec. 18, 2007

(65) Prior Publication Data

US 2008/0163356 A1   Jul. 3, 2008

(30) Foreign Application Priority Data

Dec. 18, 2006   (KR) .................. 10-2006-0129587

(51) Int. Cl.
*H04L 9/00*       (2006.01)
*H04L 29/06*      (2006.01)
*G06F 15/16*      (2006.01)
(52) U.S. Cl. ......................................................... 726/13
(58) Field of Classification Search .................. 726/13
See application file for complete search history.

(56) References Cited

U.S. PATENT DOCUMENTS

| 7,769,873 B1 * | 8/2010 | Mackie ............... 709/229 |
| 2005/0076227 A1 * | 4/2005 | Kang et al. ............ 713/188 |
| 2005/0182950 A1 * | 8/2005 | Son et al. ............. 713/189 |

OTHER PUBLICATIONS

Peng Liu et al., Incentive-based modeling and inference of attacker intent, objectives, and strategies. ACM Transactions on Information and System Security (TISSEC) TISSEC Homepage archive vol. 8 Issue 1, Feb. 2005 ACM New York, NY, USA pp. 1-41.*

* cited by examiner

*Primary Examiner* — Kambiz Zand
*Assistant Examiner* — Aubrey Wyszynski
(74) *Attorney, Agent, or Firm* — Birch, Stewart, Kolasch & Birch, LLP

(57) ABSTRACT

The present invention relates to an apparatus and method of securing a network. In the present invention, a pattern matching engine 210 corresponding to a first security module initially performs a hardware-based filtering process for a static attack of an input network packet and transmits a normal packet determined to be normal as a result of the filtering to a dynamic attack detection module 230 corresponding to a second security module through a PL3 interface. The dynamic attack detection module 230 performs a hardware-based filtering process for a dynamic attack of the normal packet transmitted from the pattern matching engine 210. The dynamic attack detection module 230 transmits the filtering result to a main CPU 400 through a PCI 300 if filtering the dynamic attack is completed. Then, a main CPU 400 transmits a response policy based on the transmitted filtering result to a response engine 220 through the PCI 300 and the dynamic attack detection module 230 to block an abnormal packet. Therefore, the present invention is very effective in that accuracy of detection is enhanced, and weakness in processing speed and performance of a network security solution can be compensated to meet requirements on real-time.

13 Claims, 5 Drawing Sheets

FIG. 4

| Dynamic attack type | Dynamic attack name |
|---|---|
| DoS | SYN Flood, UDP Flood, DoS Echo (TCP&UDP), Ping Flood, Sun kill, Sol Syslogd, DoS Chargen, Fraggle, Smurf, Land Attack, Winnuke, Syn Fin Attack, TCP No Flag Attack, ARP Attack, ICMP Large Packet Attack, FTP Bounce |
| Fragment DoS | TearDrop, Bonk, Jolt, Jolt2 ICMP, Jolt2 UDP, Nestea, Newtear, SynDrop, Trash, Tiny Fragment |
| IP Scan | IP Scan, Address Sweep Attack |
| Scan | SYN Scan, Non SYN Scan, Xmas Scan, Tiny Scan, UDP Port Scan FIN Scan |

APPARATUS AND METHOD OF SECURING NETWORK

BACKGROUND

1. Field

The present invention relates to an apparatus and method of securing a network, and more particularly, to an apparatus and method of securing a network for detecting and blocking a dynamic attack on a network packet using hardware logic.

2. Description of the Related Art

FIG. 1 is a view showing the configuration of a conventional network security apparatus.

Referring to FIG. 1, a pattern matching engine 21 corresponding to a first security module initially performs hardware-based filtering to detect a static attack of a network packet input through an interface (I/F) unit 10. Then, a packet determined to be normal as a result of the filtering and the result of performing a filtering process are transmitted to a main central processing unit (CPU) 40 corresponding to a second security module through a peripheral component interconnect 30 (hereinafter, referred to as a PCI).

The main CPU 40 corresponding to the second security module classifies the normal packet transmitted from the pattern matching engine 21 according to the protocol, reconfigures an IP packet, and operates a previously defined 'dynamic attack detection module' for detecting a dynamic attack on each protocol, i.e., performs software-based filtering for a dynamic attack. In addition, after the static and dynamic attacks are filtered by the pattern matching engine 21 and the main CPU 40, the main CPU 40 transmits a response policy based on the result of each filtering to a response engine 22 to block an abnormal packet.

As described above, in the prior art, only a static attack of a network packet is detected based on hardware, and a dynamic attack is detected by the main CPU 40 based on software.

Accordingly, the above prior art has following problems.

First, since the main CPU 40 detects a dynamic attack through a post-detection logic processed based on software, there is a weak point in accuracy of detection and requirements on real-time. For example, if detection filters are added to detect dynamic attacks, detection ability for other attacks is lowered due to the degradation of processing performance of the main CPU 40, so that the accuracy of detecting a dynamic attack is lowered due to packet loss incurred thereby.

In addition, since the pattern matching engine 21 corresponding to the first security module transmits a normal packet and a filtering result to the main CPU 40 corresponding to the second security module and the main CPU processes the packet, if transmission is delayed when transmitting the normal packet and the filtering result, a loss of normal packets and filtering results subsequently transmitted occurs

SUMMARY

Accordingly, an object of the present invention is to provide a network security apparatus that implements hardware logic for blocking dynamic attacks.

Another object of the present invention is to provide a network security apparatus, in which a means for filtering static and dynamic attacks is integrated on a single board.

A further object of the present invention is to provide a network security method for detecting and processing static and dynamic attacks through a hardware-based filtering function.

According to an aspect of the present invention for achieving the objects, there is provided a network security apparatus comprising a first security module for detecting a static attack on a network packet; a second security module for detecting a dynamic attack on the network packet undetected by the first security module; and a response engine for providing a response policy based on a detection result of the first security module and the second security module, wherein the first security module and the second security module detect the static attack and the dynamic attack by performing a filtering process based on hardware logic.

The first security module and the second security module may be provided on a blocking board together.

The first security module and the second security module may be interconnected through a POS-PRY Level 3 (PL3) interface to transfer a packet.

The second security module may be connected to a main CPU through a PCI interface, wherein the main CPU manages a security policy of the first security module and the second security module.

The second security module may comprise one or more memories one-to-one corresponding to a type of a dynamic attack according to the type of the dynamic attack; a threshold value storage unit for storing at least one threshold value one-to-one corresponding to a dynamic attack name of the type of the dynamic attack; and a control unit for determining whether or not there is a dynamic attack by accessing relevant memory corresponding to the type of the dynamic attack and comparing the number of detections of the dynamic attack counted for a certain period of time with a threshold value corresponding to the dynamic attack name.

The second security module may be a high speed packet processor based on a field-programmable gate array (FPGA).

According to another aspect of the present invention, there is provided a network security method comprising a static attack filtering step for performing a hardware-based filtering process for a static attack of a network packet; a dynamic attack filtering step for performing a hardware-based filtering process for a dynamic attack of a normal packet, the normal packet being determined to be normal in the static attack filtering step; and a response step for performing a response policy based on a result of filtering the static attack and the dynamic attack.

The method may further comprise a storing step for storing the result of filtering the static attack and the dynamic attack.

The normal packet determined to be normal in the static attack filtering step may be transferred through a POS-PHY Level 3 (PL3) interface.

The dynamic attack filtering step may store at least one threshold value one-to-one corresponding to a dynamic attack name, and determine the network packet to be abnormal if the number of detections of the dynamic attack of the network packet counted for a certain period of time exceeds a corresponding threshold value.

The dynamic filtering step may be implemented in a high speed packet processor based on an FPGA.

The dynamic filtering step may analyze the normal packet in a corresponding memory region corresponding to a type of a dynamic attack desired to be detected.

The type of the dynamic attack may include at least one of DoS, DDoS, fragment DoS, IP scan, and scan.

The dynamic attack name may include at least one of SYN flood, UDP flood, DoS echo (TCP & UDP), ping flood, sun kill, Sol Syslogd, DoS Chargen, Fraggle, Smurf, land attack, Winnuke, Syn Fin attack, TCP No flag attack, ARP attack, ICMP large packet attack, FTP bounce, IP scan, address sweep attack, SYN scan, Non SYN scan, Xmas scan, Tiny scan, UDP port scan, and FIN scan.

According to the configuration and flow as described above, an apparatus and method of securing a network, which supports detection and blockage of dynamic attacks based on hardware according to the present invention, detects a dynamic attack on a network packet using a hardware logic and executes a response on the dynamic attack.

BRIEF DESCRIPTION OF THE DRAWINGS

FIG. 4 is a table showing examples of dynamic attacks classified according to the type for describing the present invention.

DETAILED DESCRIPTION

Hereinafter, an apparatus and method of securing a network, which supports detection and blockage of dynamic attacks based on hardware, will be described in more detail with reference to the accompanying drawings.

Figure 1:
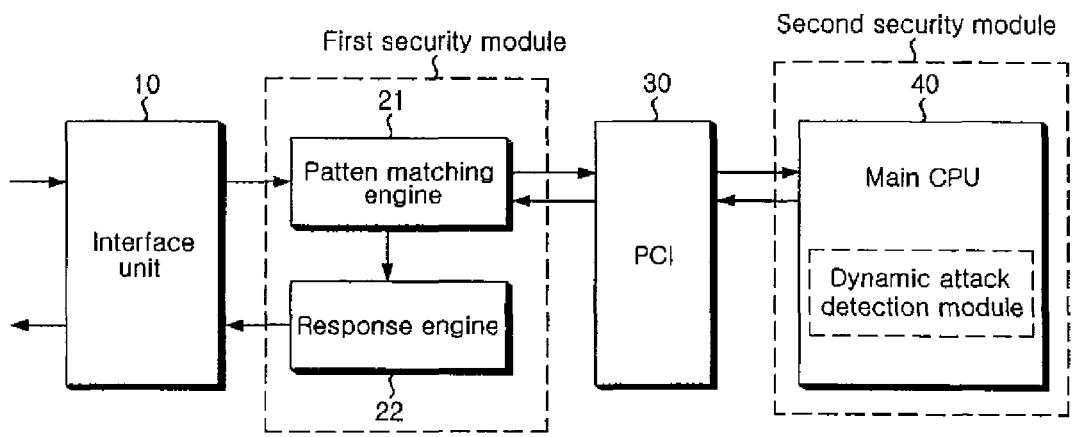
FIG. 1 is a view showing a conventional network security apparatus.
Figure 2:
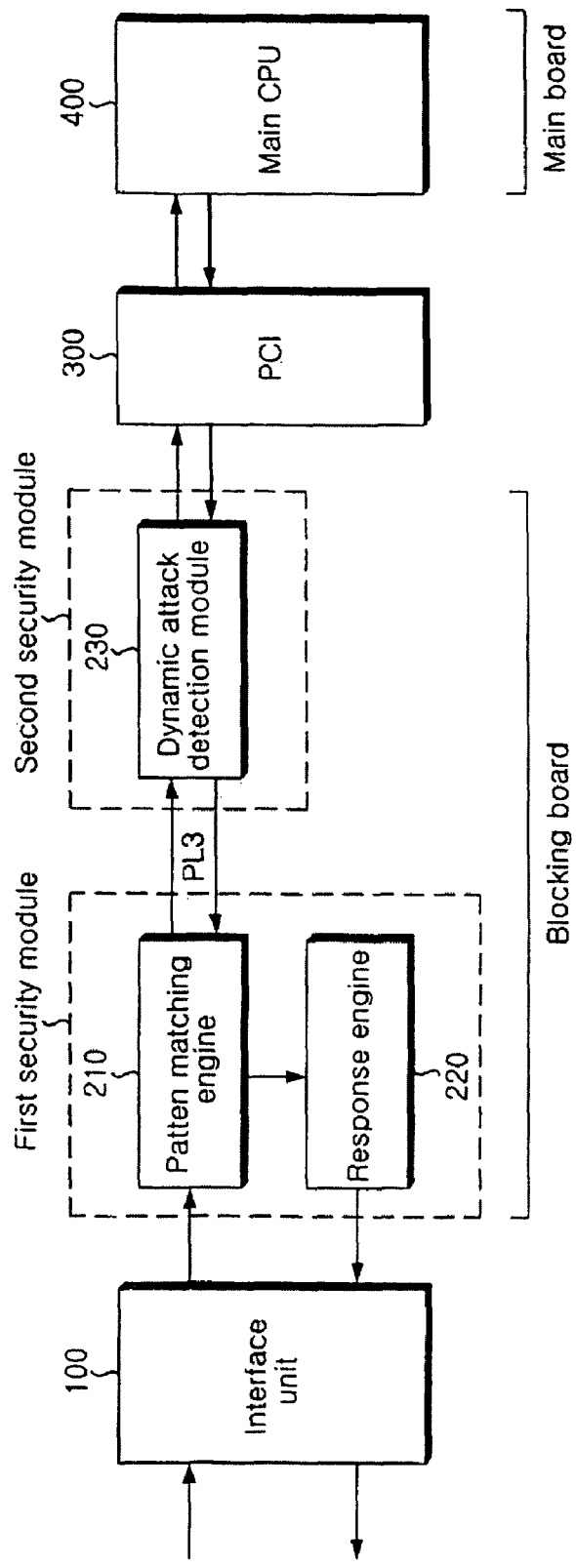
FIG. 2 is a view showing a network security apparatus applied to a preferred embodiment of the present invention.
Figure 3:
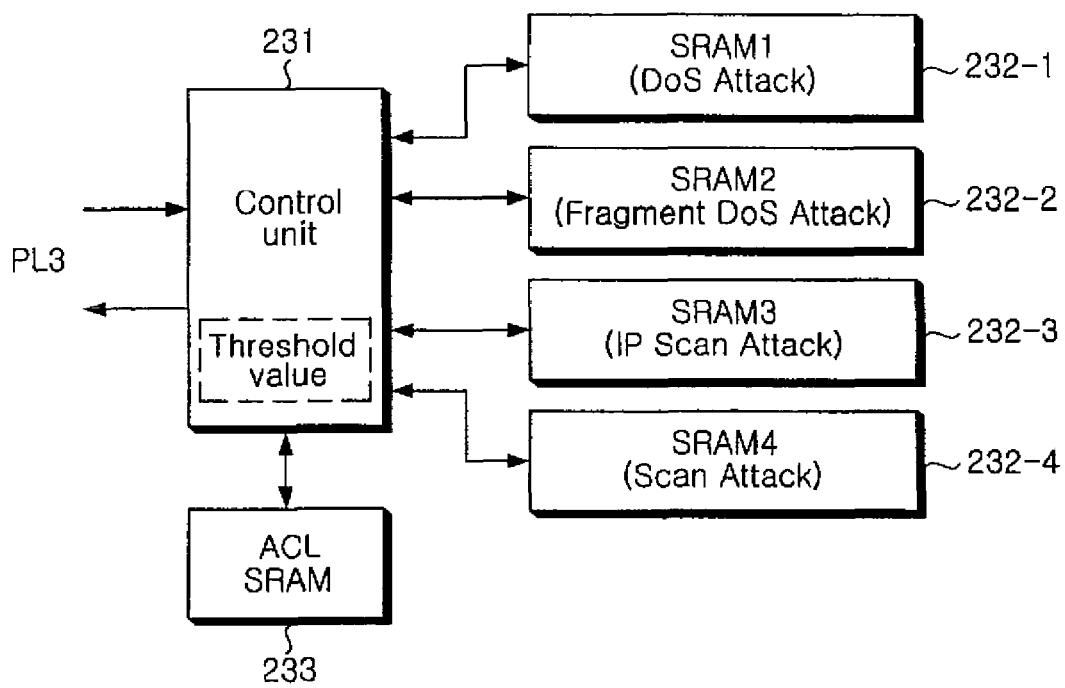
FIG. 3 is a view of details of a dynamic attack detection module of FIG. 2.

FIG. 2 is a view showing a network security apparatus applied to a preferred embodiment of the present invention, FIG. 3 is a view of details of a dynamic attack detection module of FIG. 2, and FIG. 4 is a table showing examples of dynamic attacks classified according to the type.

Referring to FIG. 2, there is provided a first security module for performing a general integrity test and detecting static attacks of packets if the packets are collected from a network interface unit 100. The first security module comprises a pattern matching engine 210 for testing packets based on security policy information, and a response engine 220 for blocking packets based on a predetermined response policy.

Then, there is provided a second security module as a dynamic attack detection module 230 for detecting dynamic attacks (flooding, denial of service (DoS), distributed DoS (DDoS), scan and the like) on the packets undetected by the first security module. The dynamic attack detection module 230 is implemented using a high-speed packet processor based on a field-programmable gate array (hereinafter, referred to as FPGA). This means that a function for detecting dynamic attacks, e.g., flooding, DoS, DDoS, and scan attacks, conventionally processed by the main CPU 400 installed on a main board is processed based on hardware.

The first security module and the second security module are not configured on the main board having the main CPU 40 mounted thereon, but configured on a separate blocking board in the form of a chip. Such first and second security modules are interfaced with each other in a POS-PHY level 3 (PL3) manner on the blocking board.

In addition, the main CPU for controlling the pattern matching engine 210 and the dynamic attack detection module 230 configured on the blocking board and managing a security policy interfaces with the blocking board through a PCI 300.

In the meantime, the dynamic attack detection module 230 is provided with a plurality of memory (SRAM) to process a variety of dynamic attacks. This will be described referring to FIG. 3 showing the detailed configuration of the dynamic attack detection module 230.

FIG. 3 shows the detailed configuration of a dynamic attack detection module of FIG. 2.

Referring to FIG. 3, there are provided an access control list (hereinafter, referred to as ACL) SRAM 233 for storing the security policy input from the main CPU 400 through the PCI 300, and SRAM1 232-1 to SRAM4 232-4 for respectively storing attack names one-to-one corresponding to dynamic attacks depending on the type of the dynamic attack (refer to FIG. 4).

Then, there is provided a control unit 231 for performing a hardware-based filtering process for a dynamic attack of a normal packet based on the security policy previously stored in the ACL SRAM 233 if the normal packet is transmitted from the pattern matching engine 210 through the PL3 interface. The control unit 231 classifies the transmitted normal packet according to the protocol, reconfigures an IP packet, and detects a dynamic attack on each protocol based on the security policy previously stored in the ACL SRAM 233. At this time, the control unit 231 selectively uses the SRAM1 232-1 to SRAM4 232-4 one-to-one corresponding to respective dynamic attack types depending on the type of a dynamic attack desired to be detected, and at least one or more threshold values according to dynamic attacks.

The dynamic attack detection module 230 so configured transmits a filtering result to the main CPU 400 through the PCI 300 if filtering the dynamic attack is completed. Then, the main CPU 400 transmits a response policy based on the transmitted filtering result to the response engine 220 through the PCI 300 and the dynamic attack detection module 230 to block an abnormal packet.

Figure 5:
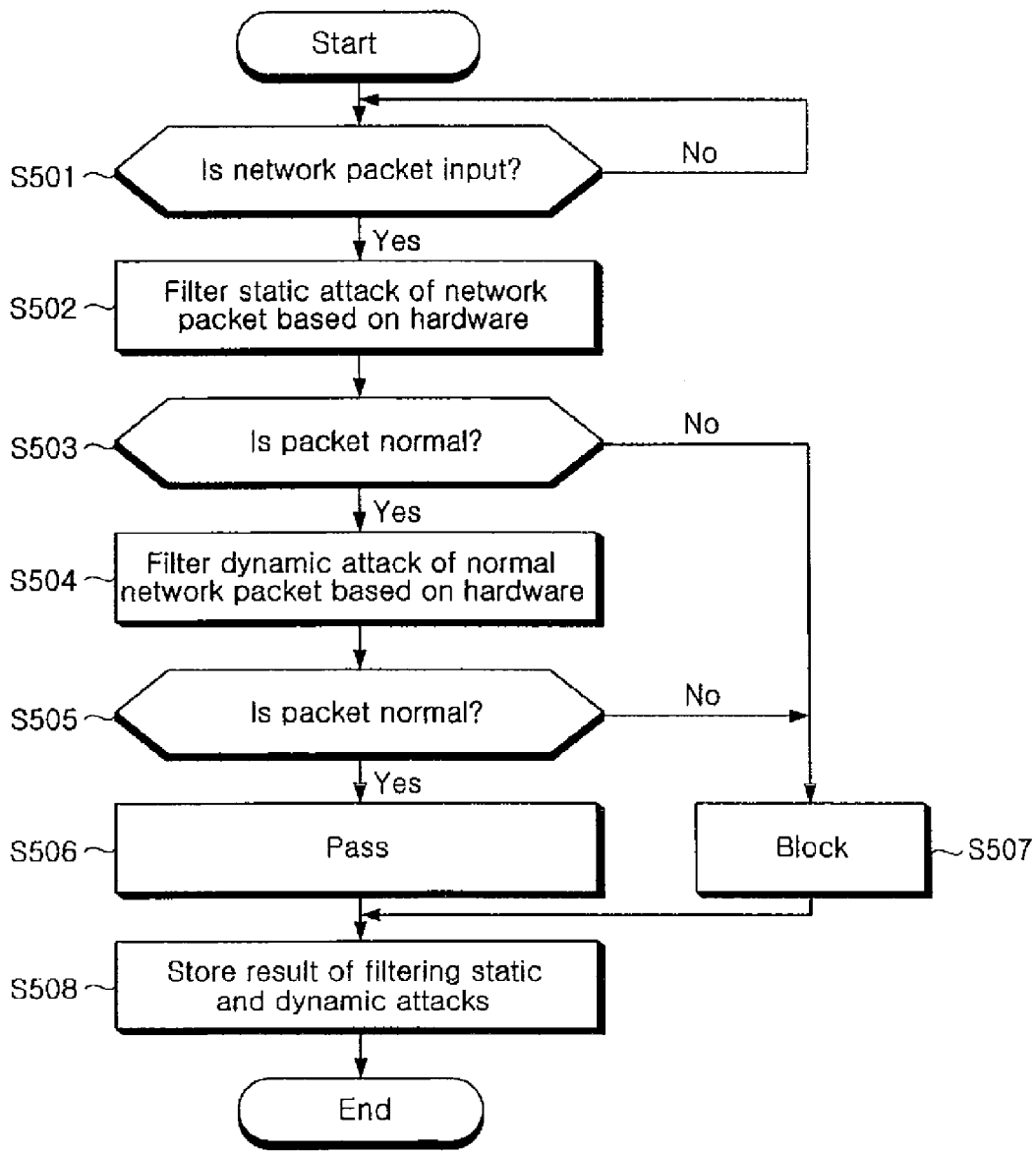
FIG. 5 is a flowchart illustrating a network security method applied to a preferred embodiment of the present invention.

Next, FIG. 5 is a flowchart illustrating a network security method applied to a preferred embodiment of the present invention. Hereinafter, the operation of the hardware-based network security apparatus supporting detection and blockage of dynamic attacks so configured will be described in detail with reference to the accompanying drawings.

First, a network packet is input through the I/F unit 100 (Yes of step S501). Then, the pattern matching engine 210 corresponding to the first security module initially performs hardware-based filtering for a static attack of the input network packet (step S502).

If the packet is normal (Yes of step S503), the pattern matching engine 210 transmits the corresponding normal packet to the dynamic attack detection module 230 corresponding to the second security module through the PL3 interface. Contrarily, if the packet is abnormal (No of step S503), the pattern matching engine transmits packet information of the corresponding abnormal packet to the response engine 220 to block the abnormal packet (step S507).

In the meantime, the dynamic attack detection module 230 performs hardware-based filtering for a dynamic attack of the normal packet transmitted from the pattern matching engine 210 through the PL3 interface (step S504). Step S504 will be described in detail with reference to the accompanying drawings.

Referring to FIG. 3, the control unit 231 in the dynamic attack detection module 230 classifies the normal packet transmitted from the pattern matching engine 210 according to the protocol, reconfigures an IP packet, and detects a dynamic attack based on the security policy previously stored in the ACL SRAM 233. That is, the control unit 231 analyzes the reconfigured network packet in a corresponding region among the SRAM1 232-1 to SRAM4 232-4 respectively corresponding to the type of a dynamic attack (DoS type, fragment DoS type, IP scan type, or scan type) (see FIG. 4) desired to be detected, and counts the number of detections of a dynamic attack for a certain period of time. Then, the control unit determines whether or not there is the attack of the corresponding network packet by comparing the number of counted detections with one or more threshold values respectively corresponding to dynamic attack names (see FIG. 4).

In this manner, the control unit 231 determines the packet as a normal packet (Yes of step S505) if the number of detections respectively corresponding to the dynamic attack names does not exceed a corresponding threshold value, and the control unit determines the packet as an attacked abnormal packet (No of step S505) if the number of detections respectively corresponding to the dynamic attack names exceeds a corresponding threshold value.

Then, the control unit 231 transmits the determined filtering result to the main CPU 400 through the PCI 300. The main CPU 400 transmits a response policy based on the transmitted filtering result to the response engine 220 through the PCI 300 and the dynamic attack detection module 230 again, thereby controlling the corresponding packet to pass (step S506) or to be blocked (step S507).

In addition, the main CPU 400 stores the results of filtering the static and dynamic attacks respectively transmitted from the pattern matching engine 210 and the control unit 231 of the detection module 230 (step S508).

The apparatus and method of securing a network according to the present invention as described above detects and blocks a dynamic attack on a network packet using hardware logic. Thus, there are effects in that accuracy of detection is enhanced, and weakness in processing speed and performance of a network security solution can be compensated to meet requirements on real-time.

As described above, although the present invention has been described in connection with the embodiments illustrated in the drawings, the embodiments of the present invention are only for illustrative purposes. It will be understood by those skilled in the art that various changes and modifications can be made thereto without departing from the technical spirit and scope of the present invention. Accordingly, the technical scope of the present invention should be defined by the technical spirit of the appended claims.

For example, the present invention can be widely applied to and used for a high performance trespass blocking system, a network management system (NTMS), a security module of network equipment such as a switch or router, a security module for a home gateway, a DDoS dedicated detection solution at a network terminal for an industrial server, or the like.

What is claimed is:

1. A network security apparatus, comprising:
a first security module for detecting a static attack on a network packet;
a second security module, which is a high speed packet processor based on an FPGA, for detecting a dynamic attack on the network packet undetected by the first security module; and
a response engine for providing a response policy based on a detection result of the first security module and the second security module,
wherein the first security module and the second security module detect the static attack and the dynamic attack by performing a filtering process based on hardware logic, and
wherein the second security module stores at least one threshold value one-to-one corresponding to a dynamic attack name of a type of the dynamic attack, compares the number of counted detections with one or more threshold values respectively corresponding to dynamic attack names, and determines whether there is an attack of the corresponding network packet or not.

2. The apparatus as claimed in claim 1, wherein the first security module and the second security module are provided on a blocking board together.

3. The apparatus as claimed in claim 2, wherein the first security module and the second security module are interconnected through a POS-PHY Level 3 (PL3) interface to transfer a packet.

4. The apparatus as claimed in claim 3, wherein the second security module is connected to a main CPU through a PCI interface, the main CPU managing a security policy of the first security module and the second security module.

5. The apparatus as claimed in claim 3, wherein the second security module comprises:
one or more memories one-to-one corresponding to the type of a dynamic attack according to the type of the dynamic attack;
a threshold value storage unit for storing the at least one threshold value one-to-one corresponding to the dynamic attack name of the type of the dynamic attack; and
a control unit for determining whether or not there is a dynamic attack by accessing relevant memory corresponding to the type of the dynamic attack and comparing the number of detections of the dynamic attack counted for a certain period of time with a threshold value corresponding to the dynamic attack name.

6. The apparatus as claimed in claim 5, wherein the type of the dynamic attack includes at least one of DoS, fragment DoS, IP scan, and scan.

7. The apparatus as claimed in claim 5, wherein the dynamic attack name includes at least one of SYN flood, UDP flood, DoS echo (TCP & UDP), ping flood, sun kill, Sol Syslogd, DoS Chargen, Fraggle, Smurf, land attack, Winnuke, Syn Fin attack, TCP No flag attack, ARP attack, ICMP large packet attack, FTP bounce, IP scan, address sweep attack, SYN scan, Non SYN scan, Xmas scan, Tiny scan, UDP port scan, and FIN scan.

8. A network security method, comprising:
a static attack filtering step for performing a hardware-based filtering process for a static attack of a network packet;
a dynamic attack filtering step for performing a hardware-based filtering process, which is implemented in a high speed packet processor based on an FPGA, for a dynamic attack of a normal packet, the normal packet being determined to be normal in the static attack filtering step; and
a response step for performing a response policy based on a result of filtering the static attack and the dynamic attack, wherein the dynamic attack filtering step comprises:
storing at least one threshold value one-to-one corresponding to a dynamic attack name of a type of the dynamic attack,
comparing the number of counted detections with one or more threshold values respectively corresponding to dynamic attack names, and
determining whether there is an attack of the corresponding network packet or not.

9. The method as claimed in claim 8, further comprising a storing step for storing the result of filtering the static attack and the dynamic attack.

10. The method as claimed in claim 9, wherein the normal packet determined to be normal in the static attack filtering step is transferred through a POS-PHY Level 3 (PL3) interface.

11. The method as claimed in claim 8, wherein the dynamic filtering step analyzes the normal packet in a corresponding memory region corresponding to the type of the dynamic attack desired to be detected.

12. The method as claimed in claim 11, wherein the type of the dynamic attack includes at least one of DoS, DDoS, fragment DoS, IP scan, and scan.

13. The method as claimed in claim 8, wherein the dynamic attack name includes at least one of SYN flood, UDP flood, DoS echo (TCP & UDP), ping flood, sun kill, Sol Syslogd, DoS Chargen, Fraggle, Smurf, land attack, Winnuke, Syn Fin attack, TCP No flag attack, ARP attack, ICMP large packet attack, FTP bounce, IP scan, address sweep attack, SYN scan, Non SYN scan, Xmas scan, Tiny scan, UDP port scan, and FIN scan.

* * * * *